(12) United States Patent
Hetrick et al.

(10) Patent No.: US 8,628,059 B2
(45) Date of Patent: Jan. 14, 2014

(54) ASSEMBLY FOR A MOVABLE FRAME

(75) Inventors: Randal Hetrick, San Francisco, CA (US); Tae Kim, San Francisco, CA (US); Christine Marcelino, San Francisco, CA (US); Stephanie Russo, San Francisco, CA (US)

(73) Assignee: Fitness Anywhere, LLC, San Francisco, CA (US)

( * ) Notice: Subject to any disclaimer, the term of this patent is extended or adjusted under 35 U.S.C. 154(b) by 0 days.

(21) Appl. No.: 13/420,491

(22) Filed: Mar. 14, 2012

(65) Prior Publication Data
US 2013/0069328 A1     Mar. 21, 2013

Related U.S. Application Data

(60) Provisional application No. 61/453,047, filed on Mar. 15, 2011.

(51) Int. Cl.
*B60P 1/00* (2006.01)

(52) U.S. Cl.
USPC ...... 254/8 R; 254/9 R; 280/79.11; 280/43.17; 280/79.7; 16/34

(58) Field of Classification Search
USPC .............. 280/79.11, 79.7, 43.17, 47.32, 79.3; 16/19, 29, 30, 32, 34; 254/8 R, 9 R, 10
See application file for complete search history.

(56) References Cited

U.S. PATENT DOCUMENTS

| | | | | |
|---|---|---|---|---|
| 1,063,620 A | * | 6/1913 | Thornley | 482/25 |
| 1,931,446 A | * | 10/1933 | Muller | 16/34 |
| 1,999,106 A | * | 4/1935 | Muller | 16/34 |
| 3,250,513 A | * | 5/1966 | Fenner et al. | 254/9 R |
| 4,417,738 A | * | 11/1983 | Kendall | 280/43.17 |
| 5,667,230 A | * | 9/1997 | Riley et al. | 280/79.11 |
| 5,727,284 A | * | 3/1998 | Deutsch | 16/30 |
| 5,822,829 A | * | 10/1998 | Webb et al. | 16/30 |
| 6,109,625 A | * | 8/2000 | Hewitt | 280/43.24 |
| 6,405,989 B2 | * | 6/2002 | Davis et al. | 248/519 |
| 6,997,466 B2 | * | 2/2006 | Wang | 280/43.17 |
| 7,328,907 B1 | * | 2/2008 | Bileth | 280/79.11 |
| 7,438,272 B2 | * | 10/2008 | Kee et al. | 248/351 |
| 7,789,811 B2 | | 9/2010 | Cooper | |
| 2006/0038369 A1 | | 2/2006 | Abraham | |
| 2006/0066065 A1 | | 3/2006 | Mason et al. | |
| 2008/0061523 A1 | | 3/2008 | Holand | |

OTHER PUBLICATIONS

International Search Report and Written Opinion PCT/US2012/029122, Oct. 29, 2012.

* cited by examiner

*Primary Examiner* — J. Allen Shriver, II
*Assistant Examiner* — Steve Clemmons
(74) *Attorney, Agent, or Firm* — Vedder Price

(57) ABSTRACT

A caster assembly for a frame is described that permits a frame to be easily moved and placed. The caster assembly, which may lift a leg of the frame, can be placed or removed without picking up the frame. The caster assembly further includes a handle that moves a cam for engaging the caster assembly with the leg. A frame having at least one caster assembly is also described.

9 Claims, 9 Drawing Sheets

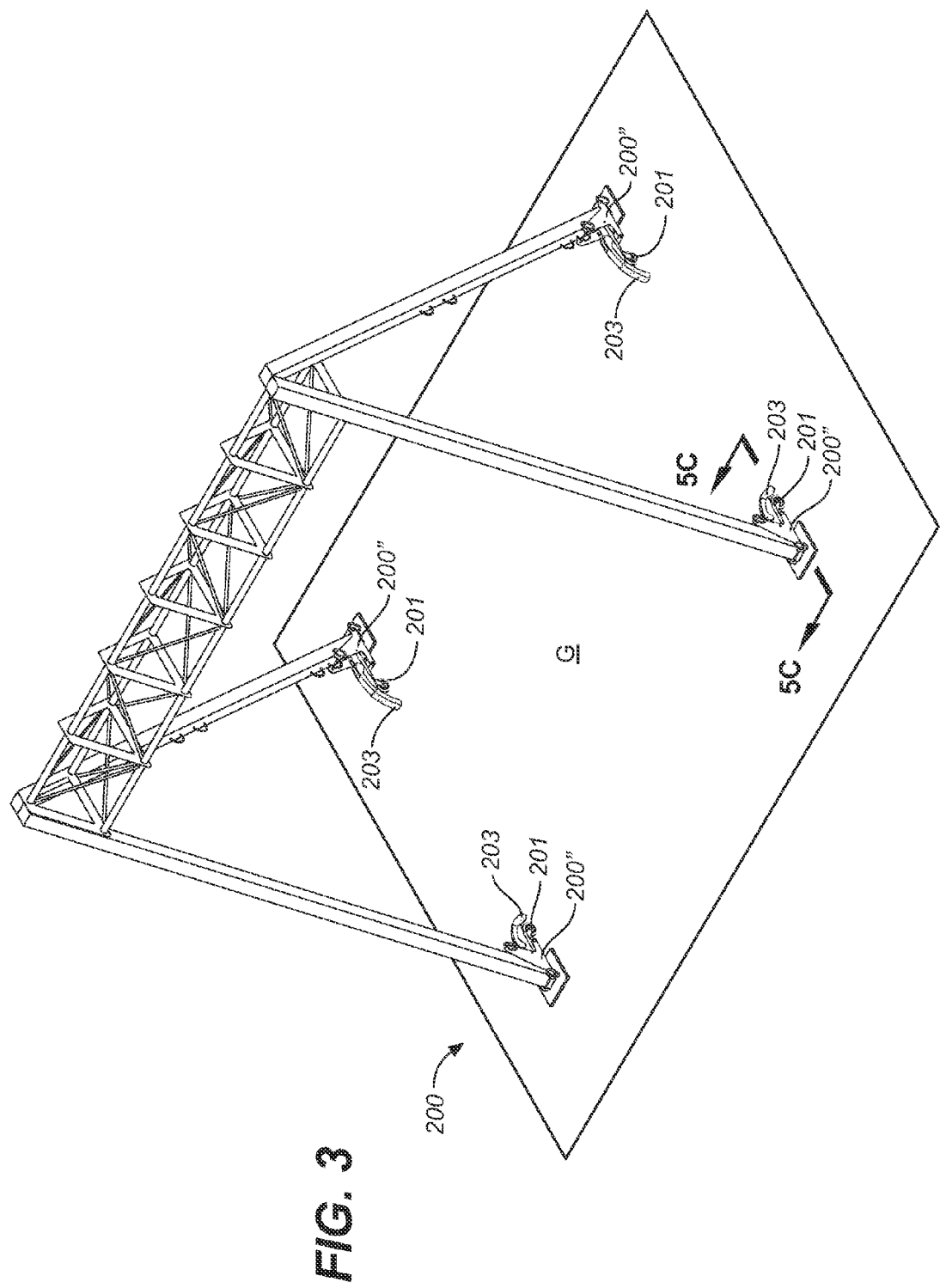

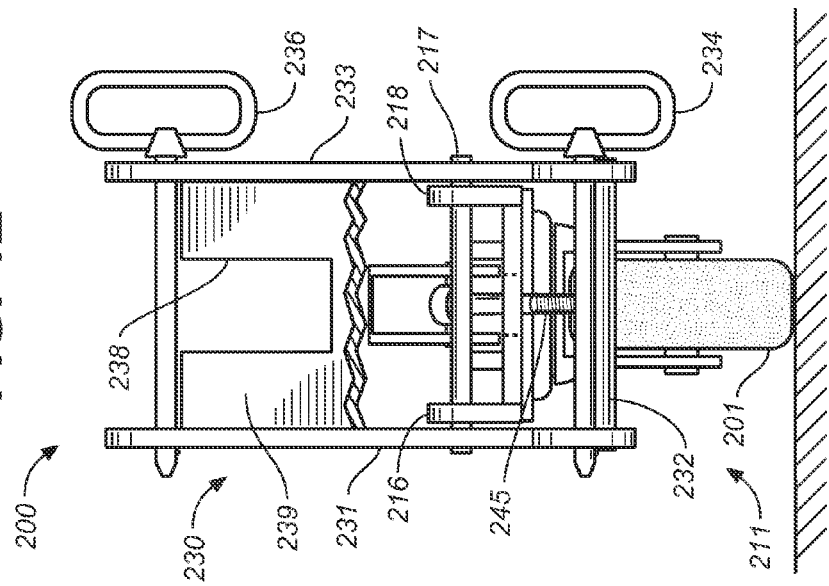
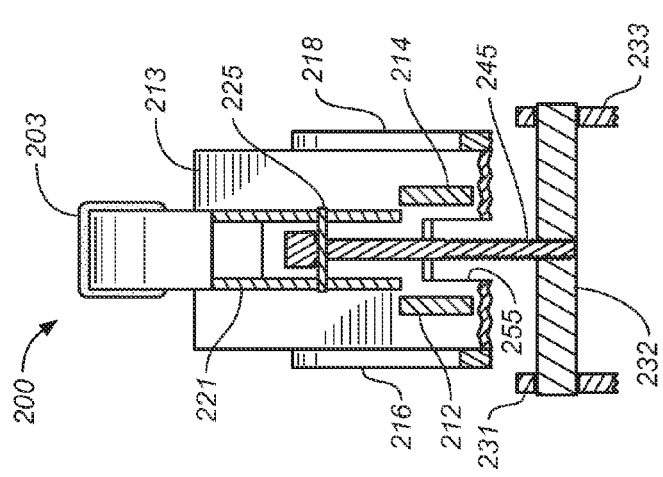
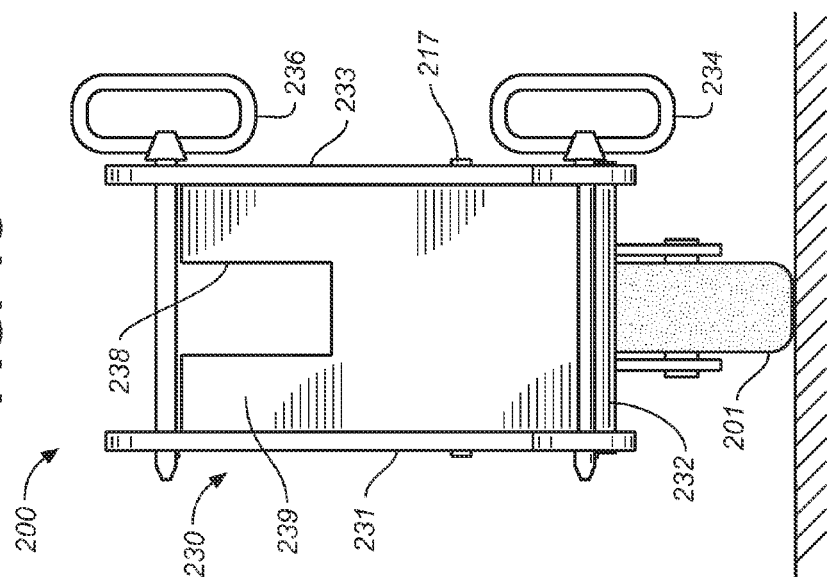

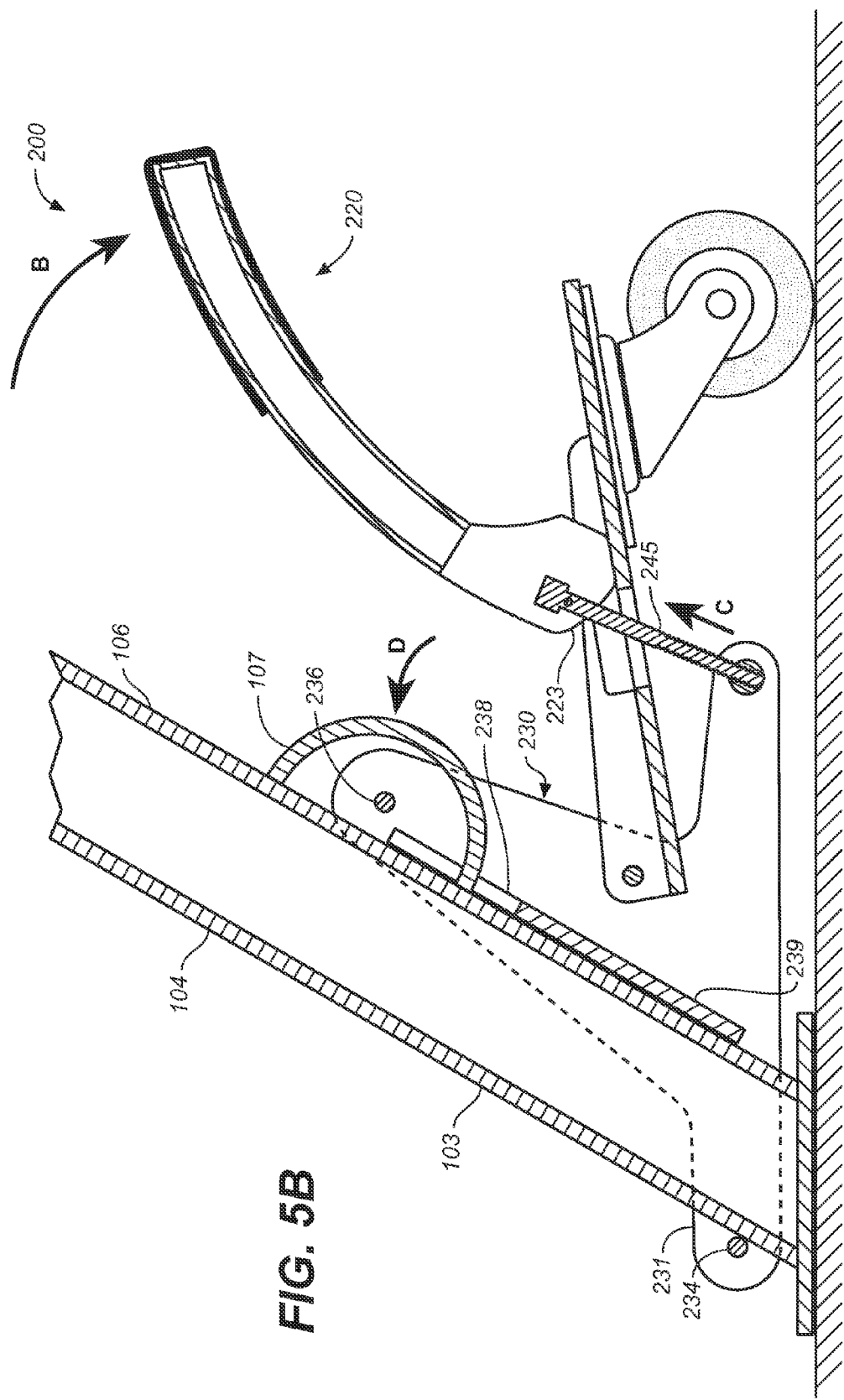

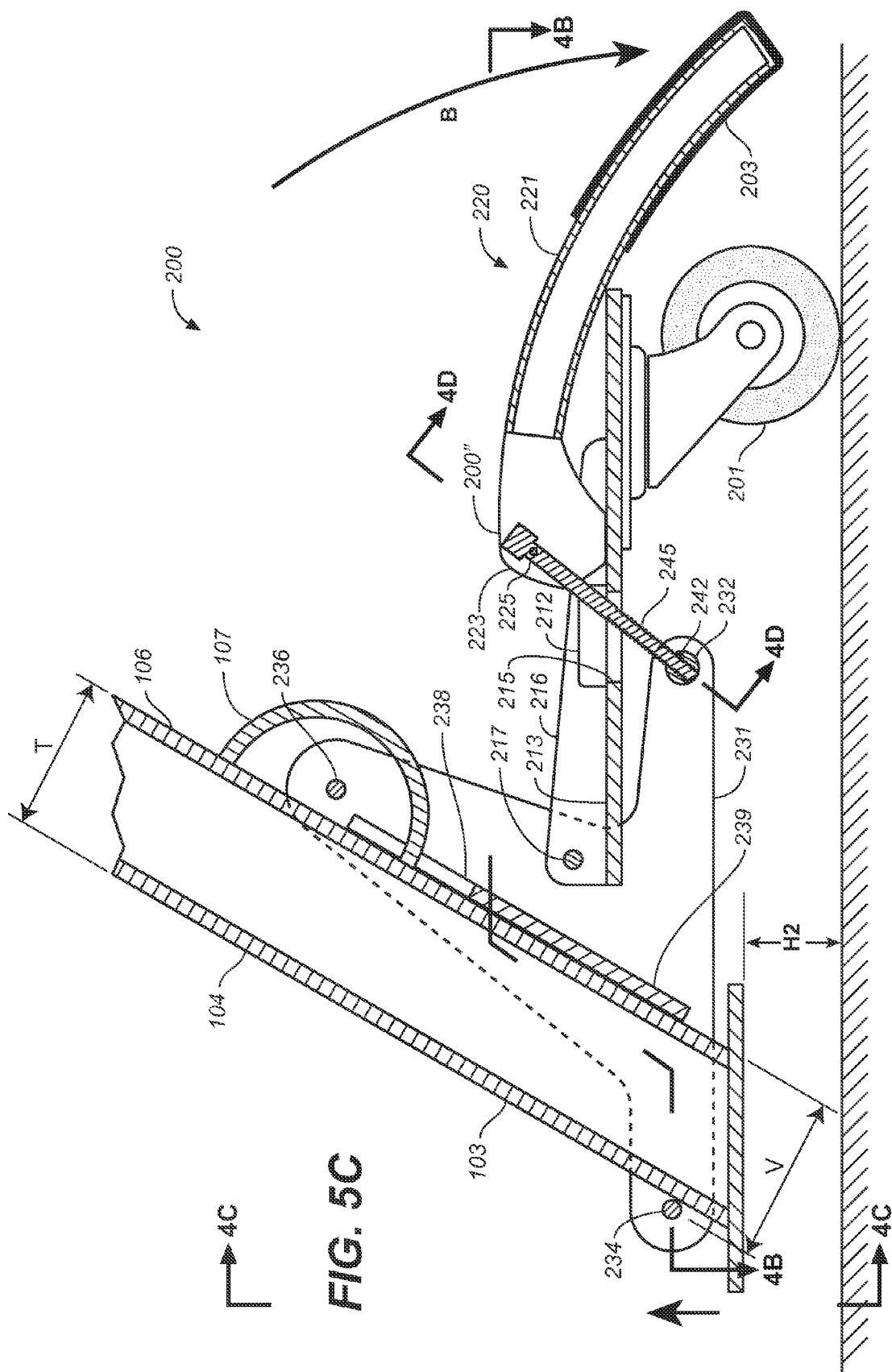

ASSEMBLY FOR A MOVABLE FRAME

CROSS-REFERENCE TO RELATED APPLICATIONS

This application claims the benefit of U.S. Provisional Application No. 61/453,047, filed Mar. 15, 2011. The entire contents of the above-listed provisional application are hereby incorporated by reference herein and made part of this specification.

BACKGROUND OF THE INVENTION

1. Field of the Invention

The present invention generally relates to exercise equipment, and more particularly to a caster assembly that may be used for moving and placing a frame or platform that may be used for exercising.

2. Discussion of the Background

Space frames are sometimes used to support exercise equipment. As an example, FIG. 1 is a perspective view of a prior art space frame 100 also referred to herein, without limitation, as a "frame," an "exercise platform" or an "S-frames," which may be used to support users while exercising. Thus, for example and without limitation the Frame of FIG. 1 may be used to support several exercise devices such as those described in U.S. Pat. No. 7,762,932, incorporated herein by reference.

While frame 100 is not necessarily or specifically a part of the present invention, a description is provided here to illustrate the present invention. Frame 100 includes a header 101 attached to a first leg 103a, second leg 103b, third leg 103c, and fourth leg 103d (or collectively, legs 103) each having an end 105 (that is, a corresponding end 105a, end 105b, end 105c, and end 105d) in contact with the ground G. Leg 103a and leg 103b form a first pair of legs in an "A" shape and leg 103c and leg 103d form a second pair of legs in an "A" shape, where each pair of legs (103a/103b, and 103c/103d) has an included angle Θ. Legs 103 may have circular, rectangular or square cross-sections. FIG. 1 shows the legs having square cross-section, having a length T on each side. The length T may be from 2 to 4 inches. Legs 103 may also have one or more loop 107 which may be used for attaching equipment.

For example and without limitation, the height H1 of frame 100 may be equal to or greater than 7 feet and may be, for example and without limitation, between approximately 7 feet and approximately 9 feet. The width W of frame 100 may be, for example and without limitation, equal to or greater than approximately 7 feet and may be, for example, between approximately 7 feet and approximately 9 feet. Angle Θ may accordingly be from approximately 43 to approximately 65 degrees.

In general, frame 100 is constructed of rigid components. Thus, for example and without limitation, header 101 and legs 103 may be formed of steel or aluminum pipe or tubing having for example and without limitation, circular, square, triangular, or rectangular cross-sectional shapes. The individual components of frame 100 may be joined by welding, screwing, with brackets, or any other means known for attaching the components.

While prior art frames, such as frame 100, has many advantages for exercising, the frame is quite bulky and heavy, and thus very difficult to move. Such a frame may weight, for example, 300 pounds, and provide sufficient support as a structure for exercising. The prior art thus lacks a device or method for easily moving the frame when not being used for exercising or to permit moving the frame to a different location for exercising.

Thus there is a need in the art for an apparatus that is easily incorporated into exercise platforms without interfering with their normal use, and which permits the easy movement of a frame when not in use.

BRIEF SUMMARY OF THE INVENTION

The present invention overcomes the disadvantages of the prior art by providing a caster assembly for use with a structure for exercising.

In certain embodiments, a caster assembly useable to transfer the weight of a frame having a plurality of legs from the ground to a caster is provided. The caster assembly includes a leg support having a movable portion, where the movable portion is adapted to removably surround an accepted leg; a wheel; and a mechanism to transfer the weight of the frame of the accepted leg from the ground to the wheel.

In certain other embodiments, a caster assembly useable to transfer the weight of one leg of a frame having a plurality of legs from the ground to a caster is provided. The caster assembly includes a leg support into which one leg may be removably accepted; a plate having a first end and a second end and including a hinge connecting the first end of the plate to the leg support, a caster including a wheel, where the caster is attached to the second end of the plate, such that the plate is rotatable in a plane perpendicular to the ground; a lever including a cam surface and a handle, and a linkage pin connecting the lever to the leg support, where the cam surface contacts the plate at a position between the first end and the second end, and where the movement of the handle causes the caster to move in a plane perpendicular to the ground. When the motion of the handle forces the leg support to engage an accepted leg and transfer the weigh of the frame to the wheel.

Yet another embodiment provides a movable frame comprising: a frame having three or more legs; and at least one caster assembly associated with one of the three or more legs, where the at least one caster assembly has a wheel and is movable between a first configuration in which the wheel does not support the weight of the frame and a second configuration in which the wheel supports the weight of the frame. The one caster assembly is adapted to removably accept a leg without lifting the frame from the ground.

These features together with the various ancillary provisions and features which will become apparent to those skilled in the art from the following detailed description, are attained by the caster assembly of the present invention, preferred embodiments thereof being shown with reference to the accompanying drawings, by way of example only, wherein:

BRIEF DESCRIPTION OF THE SEVERAL VIEWS OF THE DRAWING

FIG. 3 is a perspective view of a frame and caster assemblies of FIG. 2 with the caster assemblies in a second configuration, with the frame supported on the ground by the caster wheels;

FIG. 4C is a front view 4C-4C of FIG. 5C without showing the received leg;

FIG. 4D is sectional view 4D-4D of FIG. 5C; without showing the received leg

FIG. 4E is front view 4E-4E of FIG. 4B;

FIGS. 5A-5C are cross-sectional views of the caster assembly of FIGS. 4A-4E, where FIG. 5A is sectional view 5A-5A of FIG. 2, FIG. 5B shows the caster assembly in an intermediate configuration between that of FIGS. 2 and 3, and FIG. 5C is sectional view 5C-5C of FIG. 3.

Reference labels and/or symbols are used in the Figures to indicate certain components, aspects or features shown therein, with reference symbols common to more than one Figure indicating like components, aspects or features shown therein.

DETAILED DESCRIPTION OF THE INVENTION

Figure 1:
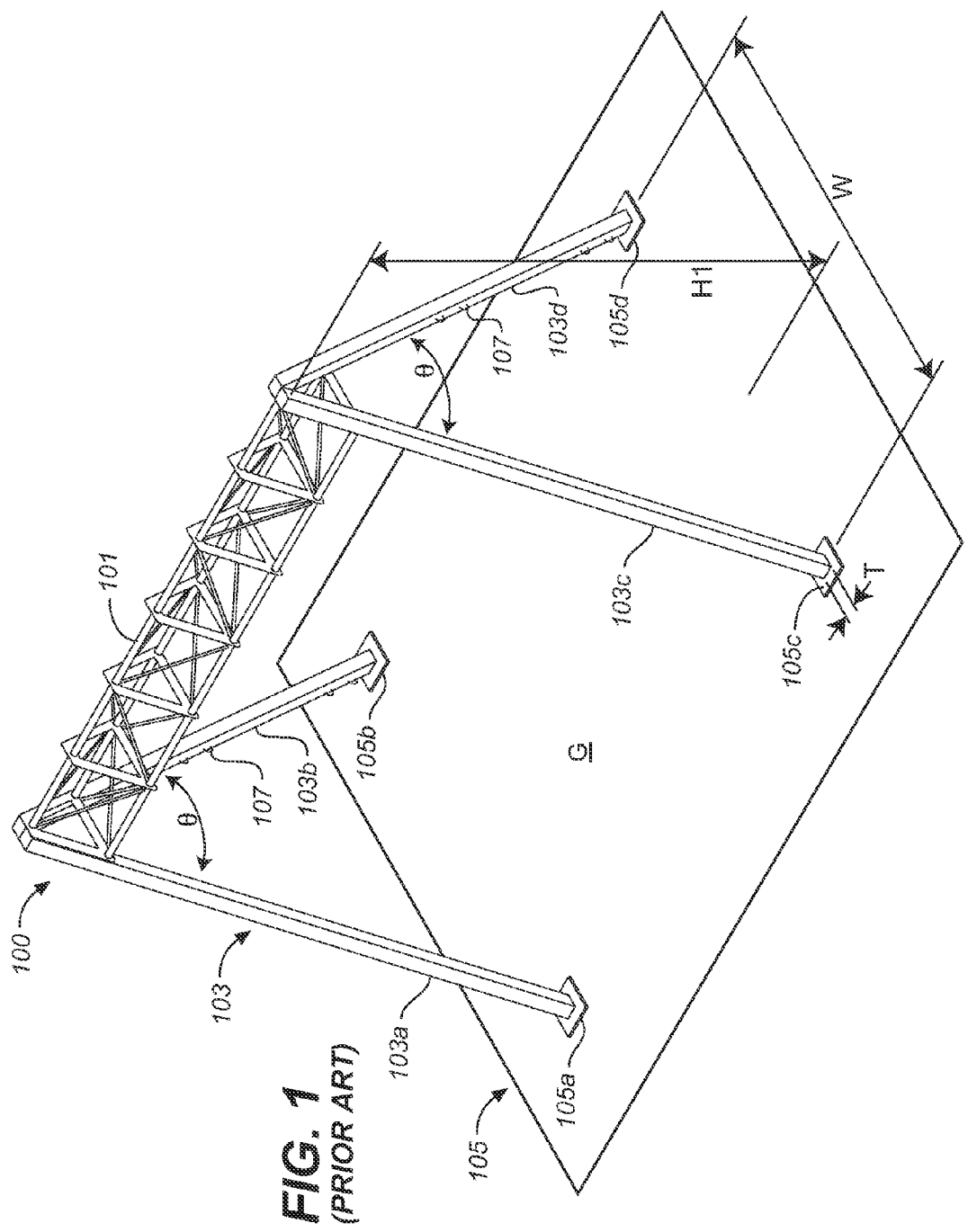
FIG. 1 is a perspective view of a prior art frame.
Figure 2:
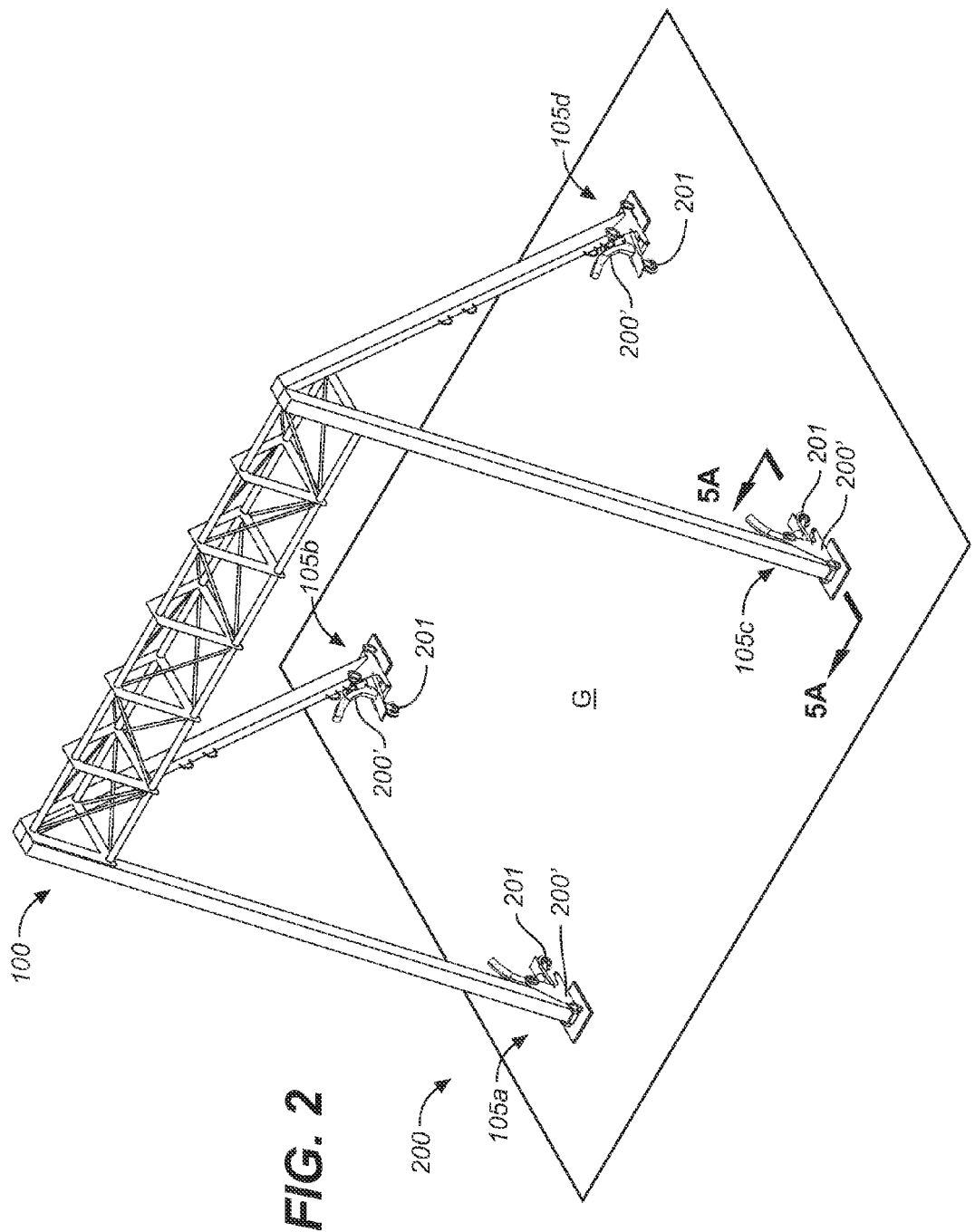
FIG. 2 is a perspective view of a frame resting on the ground and having one embodiment of a caster assembly on each leg in a first configuration.

In general, the present invention includes caster assemblies having a first configuration to allow the legs of a frame to rest on the ground and a second configuration to raise the frame from the ground so as to permit the frame to be rolled from one location to another. As one embodiment of the present invention, FIG. 2 are 3 are perspective views of a frame 100, where with ends 105 on or near ground G. Each end 105 has an associated caster assembly 200 having a wheel 201 and a handle 203. When caster assemblies 200 are used in conjunction with frame 100, wheels 201 are retractable, permitting frame 100 to rest on, or be rolled along, ground G.

More specifically, caster assembly 200 is adjustable, according to the position of handle 203, between a first caster assembly configuration 200', as shown in FIG. 2 with ends 105 resting on ground caster, and a second caster assembly configuration 200" with wheels 201 supporting the weight of frame 100 on the ground. The configuration of FIG. 2 permits frame 100 to be used for exercising, while the configuration of FIG. 3 permit the frame to be rolled on the ground.

In general, frame 100 is provided with 3 or more caster assemblies 200. In certain embodiments, caster assembly 200 may be permanently affixed to leg 103, may be removably attached to the leg, or may be not attached to the leg but engage the leg according to the movement of handle 203.

Figure 4A:
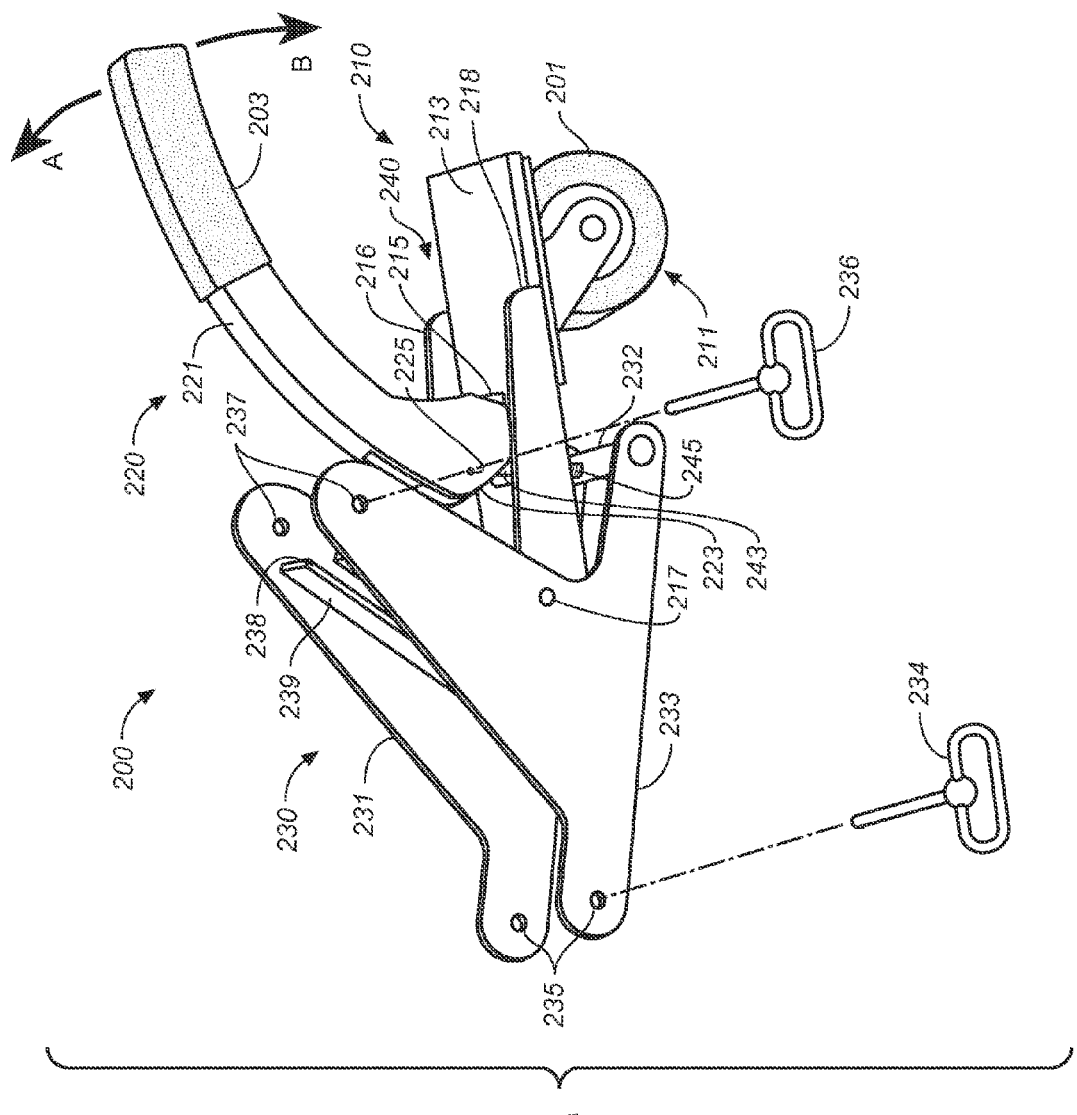
FIG. 4A is an exploded perspective view of an embodiment of a caster assembly.
Figure 4B:
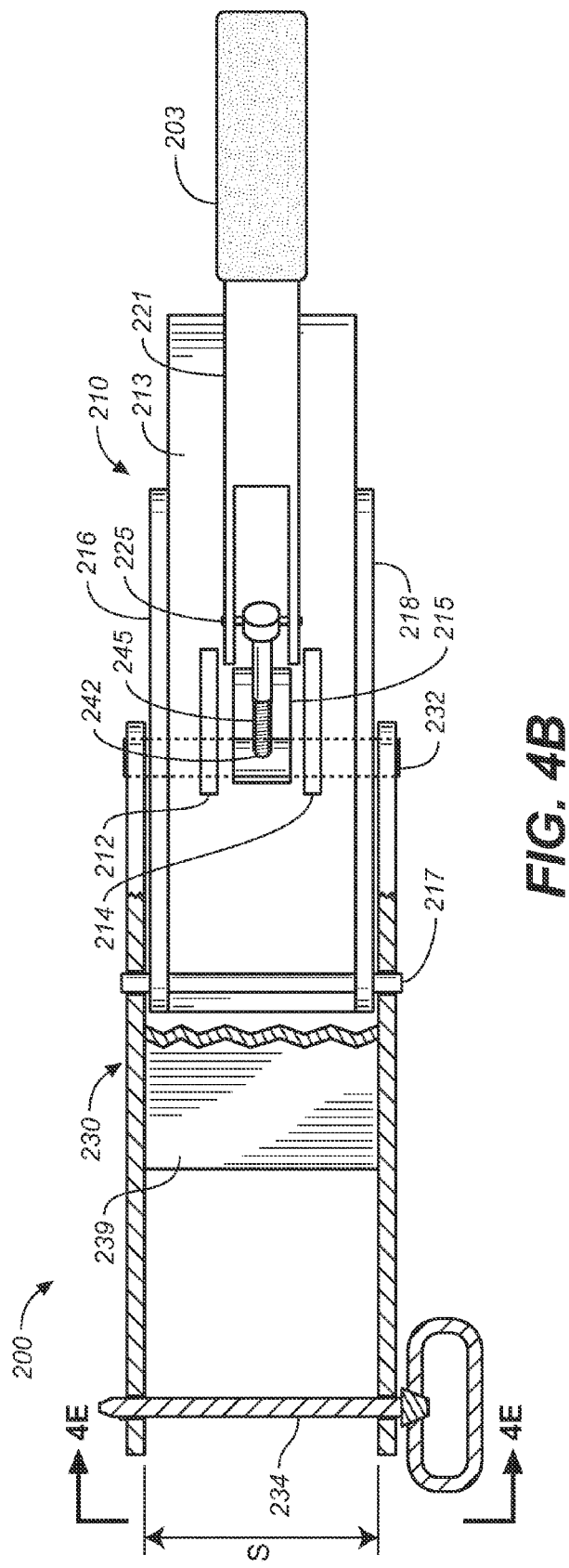
FIG. 4B is a top sectional view 4B-4B of FIG. 5C without showing the received leg.

Caster assembly 200 is shown in greater detail in: FIG. 4A in an exploded perspective view of the caster assembly; FIG. 4B in a top sectional view 4B-4B of FIG. 5C, which is a sectional view 5C-5C of FIG. 3 without showing the received leg; FIG. 4C in a front view 4C-4C of FIG. 5C without showing the received leg; FIG. 4D in a sectional view 4D-4D of FIG. 5C without showing the received leg; and FIG. 4E in a front view 4E-4E of FIG. 4B. Additional sectional views are shown in FIG. 5A as sectional view 5A-5A of FIG. 2 and FIG. 5B which is an intermediate configuration between that of FIGS. 2 and 3.

Figure 5A:
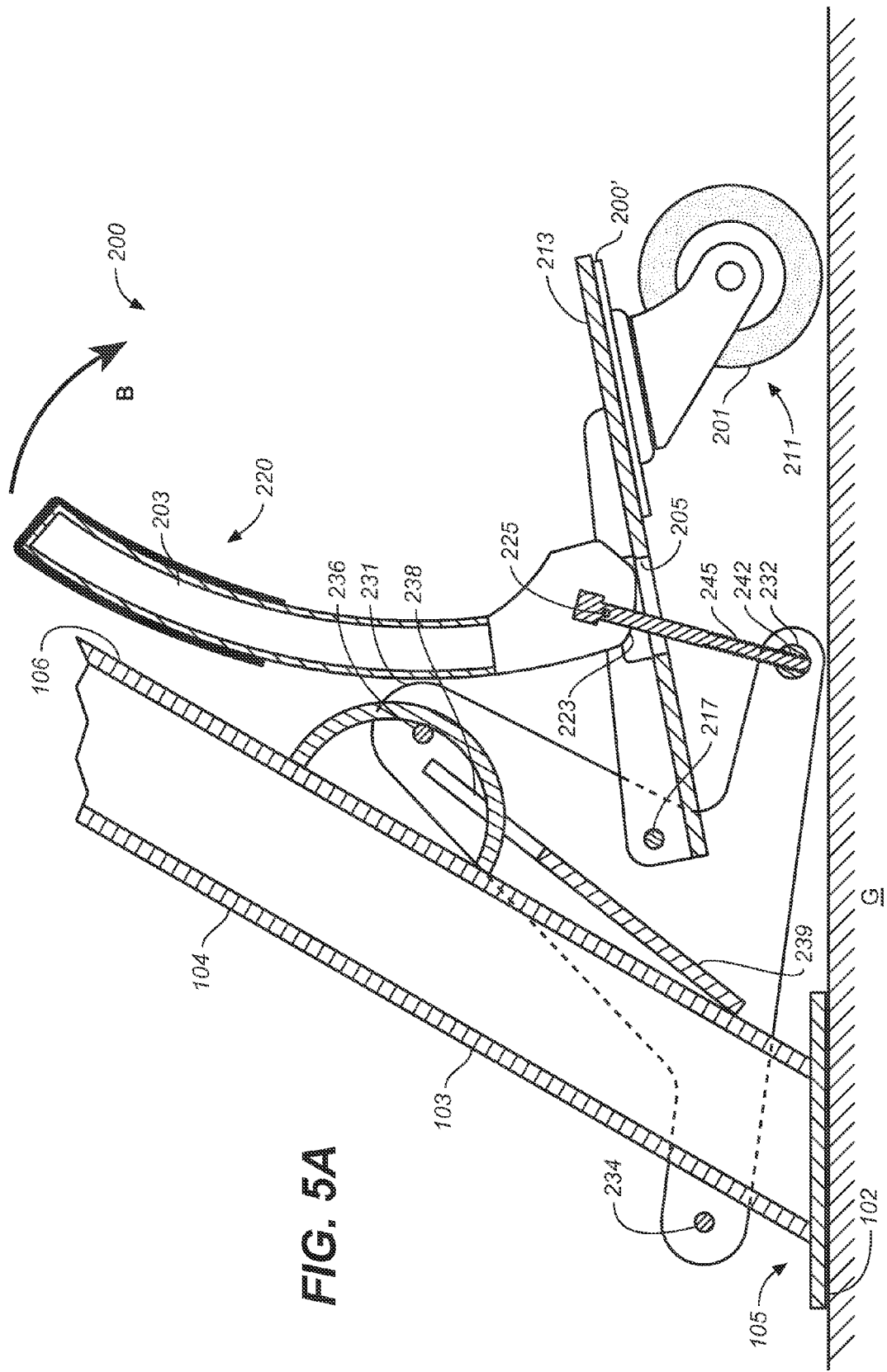

More specifically, FIGS. 5A, 5B, and 5C show caster assembly 200 as used to lift leg 103, FIG. 4A shows caster assembly 200 separately, and FIGS. 4B, 4C, 4D, and 4E show the caster assembly in use, but without showing leg 103. Where possible, similar elements are identified with identical reference numerals in the Figures. In FIGS. 5A, 5B, and 5C, the portion of plate 231 that is behind leg 103 is shown in dashed lines.

With reference to FIG. 4A, caster assembly 200 is shown as including a wheel support 210, a lever 220, a leg support 230, a connector 240, a removable pins 234 and 236.

Wheel support 210, with reference to FIGS. 4A, 4B, 4D, and 4E, includes a caster 211, a plate 213 having ledges 216 and 218, a slot 215, hinge 217, and ledges 212 and 214 on either side of the slot. Caster 211 connects wheel 201 to plate 213, and hinges 217 connect plate 213 to leg support 230.

Lever 220, with reference to FIGS. 4A, 4B, and 4D, is an elongated part 221 with handle 203 at one end, a cam surface 223 at the other end, and a hinge 225.

Leg support 230, with reference to FIGS. 4A, 4B, 4C, 4E, and 4C includes a first side plate 231 and a parallel second side plate 233 with a plate 239 connecting plates 231 and 233, and having a slot 238. Plates 231 and 233 also have matching holes 235, 237, for accepting pins 234 and 246, respectively, and hinge 232. The spacing between plates 231 and 233 is S, and is sized to be just slightly larger than the width of legs 103. Thus, for example and without limitation, for T of 3 inches, S may be approximately 3.25 inches. The perpendicular distance from plate 239 to pin 234, indicated as V in FIG. 5C, is likewise sized to accept leg 103, and thus for T of 3 inches, V may be also be approximately 3.25 inches. FIG. 4B shows hinge 232 in dashed lines as being beneath plate 213.

Connector 240, with reference to FIGS. 4A, 4B, and 4D, includes: threaded pin 245; hinge 232 having a threaded hole 242 to accept the threaded pin; and hinge 225 that supports the other end of the threaded pin.

Threaded pin 245 is thus a linkage that may transfer motion of lever 220, through the contact of cam surface 223 with plate 213, to motion of leg support 230. Thus, for example, as handle 203 is moved away from wheel 201 (indicated by arrow A) or towards wheel 210 (indicated by arrow B), cam surface 223 engages plate 213, and with the length between bars 241 and 243 having a fixed spacing, plate 213 rotates relative to leg support 230 about hinge 217. Slot 238 is sized to allow handle 203 to move through plate 239. Cam surface 223 rests on plate 213 between ledges 212 and 214 and slot 215.

The operation of caster assembly 200 is illustrated with reference to FIGS. 5A, 5B, and 5C. Leg 103 has a floor plate 102 and end 105. Without any pins 234 or 236 in holes 235 or 249, caster assembly 200 may accept leg 103, with end 105 positioned between plate 231 and 233, and against plate 239. Pin 234 may then be placed through holes 235 to surround leg 103 within leg support 230. Pin 236 may also be placed through hole 237 and loop 107 to secure caster assembly near leg 103.

As seen from FIG. 5A, caster assembly 200 is loosely associated with, but is not attached to, leg 103. With caster assembly 200 in configuration 200', leg 103 and leg support 230 both independently rests on ground G. Handle 203 may then be pulled, as indicated by arrow B. As handle 203 moves, the contact location of cam surface 223 and plate 213 moves towards wheel 201, and pin 245 pulls up on leg support 230, causing plate 239 and the pin 234 through holes 235 to move closer to leg 103.

With handle 203 in the "up" position of FIG. 5A, frame 100 is in a "resting configuration," the weight of frame 100 supported on ground G, and wheels 201 are resting on the ground.

FIG. 5B shows the position of caster assembly 200 when leg support 230 contacts leg 103. As handle 203 is moved as shown by arrow B, threaded pin 245 move as shown by arrow C, and leg support 230 rotates as shown by arrow D. In this configuration, and further pulling on handle 203 will result in an upwards force on leg 103. In the configuration of FIG. 5B, the weight of frame 100 is supported on the ground G and wheels 201 are resting on the ground.

Further downward motion of handle 203, as indicated by arrow B, will then force pin 234 through hole 235 and plate 239 to both engage, by friction, leg 130, and specifically will result in leg support 230 applying an upwards force on leg 103, transferring weight of frame 100 on to wheel 201.

FIG. 5C shows handle 203 in the full down position and caster assembly 200 in configuration 200". Leg support 230 in engaging leg 103, transferring part of the weight of frame 100 onto wheel 201. When 3 or more caster assemblies in configuration 200", frame 100 may be moved along the ground, as in FIG. 3.

With handle 203 in the "down" position of FIG. 5C, frame 100 is in a "rolling configuration," with leg 103 lifted off of ground G by a height H2. The shape of cam surface 223 is such that configuration 200" is stable, and that an upwards force on handle 203, as indicated by arrow A, is required to transition caster assembly 200 back to configuration 200'.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

We claim:

1. A caster assembly useable to transfer the weight of a frame having a plurality of legs from the ground to a caster, said caster assembly comprising: a leg support having a movable portion, where said movable portion is adapted to removably surround an accepted leg; a wheel; a mechanism to transfer the weight of the frame of the accepted leg from the ground to the wheel and a flat plate having a first end and a second end with a slot between the first end and the second end, where said first end includes a hinge connecting said first end of said plate to said leg support, and where said second end is attached to said wheel, such that said plate is rotatable in a plane perpendicular to the ground; and where said mechanism includes a lever having a cam surface and a handle, and a linkage pin connecting said lever to said leg support through said slot, where said cam surface contacts said plate at a position between said first end and said second end, and where the movement of the handle causes the caster to move in a plane perpendicular to the ground, such that the motion of the handle forces the leg support to engage an accepted leg and transfer the weight of the frame to the wheel.

2. The caster assembly of claim 1, where said wheel is the wheel of a caster.

3. The caster assembly of claim 1, where said leg support includes a plate, holes for accepting a removable pin, a removable pin, such that said leg support engages an accepted leg by forcing the plate and the removable pin against the leg.

4. The caster assembly of claim 1, where said assembly has a first configuration where said handle is in an up position and where the weight of the frame of the accepted leg is supported on the ground, and a second configuration where said handle is in a down position and where the weight of the frame of the accepted leg is supported by the wheel.

5. A caster assembly useable to transfer the weight of one leg of a frame having a plurality of legs from the ground to a caster, said caster assembly comprising: a leg support into which one leg may be removably accepted; a flat plate having a first end and a second end with a slot between the first end and the second end and including a hinge connecting said first end of said plate to said leg support, a caster including a wheel, where said caster is attached to said second end of said plate, such that said plate is rotatable in a plane perpendicular to the ground; a lever including a cam surface and a handle, and a linkage pin connecting said lever to said leg support through said slot, where said cam surface contacts said plate at a position between said first end and said second end, and where the movement of the handle causes the caster to move in a plane perpendicular to the ground, such that the motion of the handle forces the leg support to engage an accepted leg and transfer the weight of the frame to the wheel.

6. The caster assembly of claim 5, where said leg support includes a plate, holes for accepting a removable pin, a removable pin, such that said leg support engages an accepted leg by forcing the plate and the removable pin against the leg.

7. The caster assembly of claim 5, where said assembly has a first configuration where said handle is in an up position and where the weight of the frame of the accepted leg is supported on the ground, and a second configuration where said handle is in a down position and where the weight of the frame of the accepted leg is supported by the wheel.

8. A movable frame comprising: a frame having three or more legs; and at least one caster assembly associated with one of said three or more legs, where said at least one caster assembly has a wheel and is movable between a first configuration in which said wheel does not support the weight of said frame and a second configuration in which said wheel supports the weight of said frame, where said at least one caster assembly is adapted to removably accept a leg without lifting said frame from the ground where said at least one caster assembly further comprises: a flat plate having a first end and a second end with a slot between the first end and the second end, where said first end includes a hinge connecting said first end of said plate to said leg support, and where said second end is attached to said wheel, such that said plate is rotatable in a plane perpendicular to the ground;

and where said mechanism includes a lever having a cam surface and a handle, and a linkage pin connecting said lever to said leg support through said slot, where said cam surface contacts said plate at a position between said first end and said second end, and where the movement of the handle causes the caster to move in a plane perpendicular to the ground, such that the motion of the handle forces the leg support to engage an accepted leg and transfer the weight of the frame to the wheel.

9. The movable frame of claim 8, where said at least one caster assembly further comprises: a leg support having a movable portion, where said movable portion is adapted to removably surround an accepted leg; and a mechanism to transfer the weight of the frame of the accepted leg from the ground to the wheel.

* * * * *